Sept. 26, 1939.  J. C. McCUNE  2,174,400
BRAKE MECHANISM
Filed June 9, 1938   5 Sheets-Sheet 1

Fig.1

INVENTOR
JOSEPH C. McCUNE
BY
ATTORNEY

Sept. 26, 1939.   J. C. McCUNE   2,174,400
BRAKE MECHANISM
Filed June 9, 1938   5 Sheets-Sheet 2

INVENTOR
JOSEPH C. McCUNE
BY
ATTORNEY

Sept. 26, 1939.  J. C. McCUNE  2,174,400
BRAKE MECHANISM
Filed June 9, 1938  5 Sheets-Sheet 3

INVENTOR
JOSEPH C. McCUNE
BY
ATTORNEY

Sept. 26, 1939.  J. C. McCUNE  2,174,400

BRAKE MECHANISM

Filed June 9, 1938.  5 Sheets-Sheet 5

INVENTOR
JOSEPH C. McCUNE
BY
ATTORNEY

Patented Sept. 26, 1939

2,174,400

UNITED STATES PATENT OFFICE 2,174,400

BRAKE MECHANISM

Joseph C. McCune, Edgewood, Pa., assignor to The Westinghouse Air Brake Company, Wilmerding, Pa., a corporation of Pennsylvania Application June 9, 1938, Serial No. 213,858

39 Claims. (Cl. 188—153)

This invention relates to vehicle brakes and more particularly to the type embodying annular rotatable and non-rotatable friction braking elements adapted upon frictional engagement to effect braking of a vehicle wheel.

One object of the invention is to provide an improved brake mechanism of the above type which is adapted for use in braking equally well the wheel of any and all types of vehicles such as automotive busses, railway vehicles and the like.

Another object of the invention is to provide an improved brake mechanism of the above type which is relatively simple and compact in construction, positive in operation and which can readily be associated with and dissociated from a vehicle wheel.

Another object of the invention is to provide an improved brake mechanism of the above type having associated therewith an auxiliary or emergency brake mechanism.

Other objects and advantages will be apparent from the following more detailed description of the invention.

In the accompanying drawings.

Referring to the construction shown in Figs. 1 to 6 of the drawings, the reference character 10 indicates a stationary housing or casing for an axle 11 which may be driven from the ordinary differential of the vehicle or any other suitable mechanism.

Figure 1:
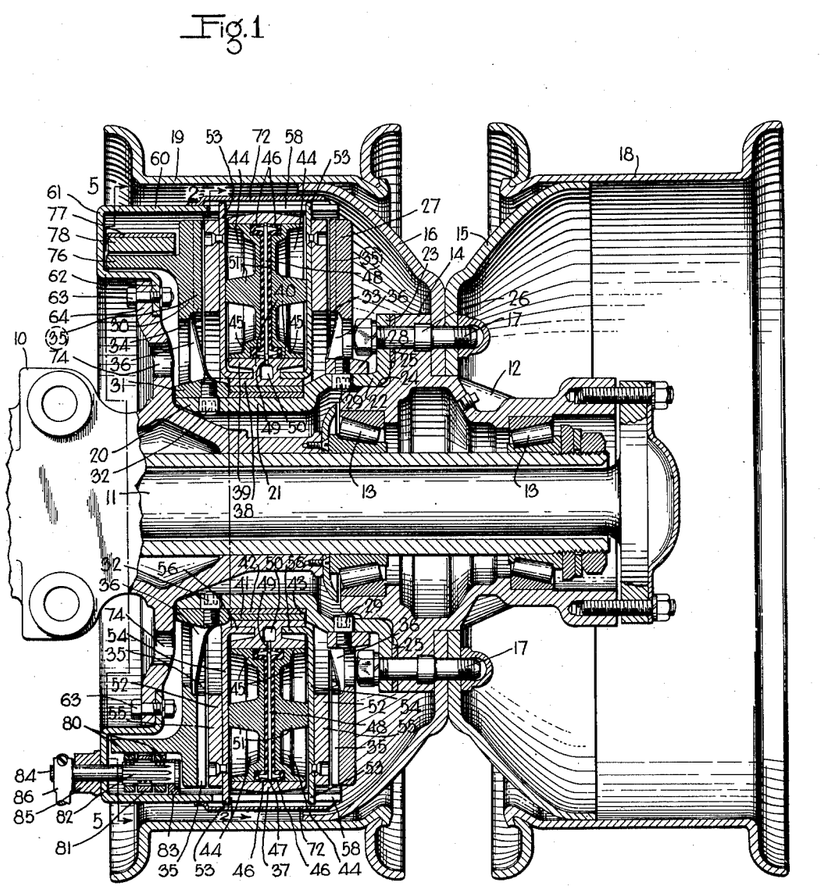
Fig. 1 is a cross-sectional view taken horizontally through a dual type of driving wheel for an automotive bus or truck and showing associated therewith, in section, one form of the improved brake mechanism.

A hub 12, suitably journaled on spaced roller bearings 13 carried by the housing 10, is secured to axle 11 for rotation therewith and is provided with a radially extending annular flange 14. A pair of annular disks 15 and 16 are secured to the outer face of flange 14 by a plurality of spaced bolts 17. The disk 15 is inclined outwardly while the disk 16 is inclined inwardly and secured to the periphery of said disks in parallel and spaced relation are a pair of tire rims 18 and 19 each of which is adapted to be provided with a resilient tire (not shown) of any desired conventional type, in the usual manner. The construction so far described is of a dual type drive wheel for an automotive vehicle, as will be evident.

Disposed in the space between the tire rim 19 and housing 10 in concentric relation with the wheel is the improved brake mechanism 15 which comprises an annular sleeve like element 20 encircling but spaced from housing 10 and having three annular portions, namely, an inner bearing portion 21, an intermediate centering portion 22 and an outer portion in the form of an annular radial flange 23.

The intermediate portion 22 of the sleeve 20 is adapted to slidably fit over an annular shoulder 24 provided on the wheel hub 12 for centering said sleeve with respect to the wheel, while the flange 23 is adapted to be secured to the inner face of the hub flange 14 by the bolts 17. A metal washer 25 is provided on each of the bolts 17 between the sleeve flange 23 and hub flange 14, and upon tightening of the bolts 17 the sleeve 20 is rigidly secured through said washers to spaced portions of the hub flange 14 in concentric relation with the hub 12 and is adapted to rotate with said hub.

Each of the bolts 17 is provided intermediate its ends with an enlarged portion 26 pressed into a suitable bore in the outer face of the hub flange 14 and securely held in place in said flange upon securing the brake sleeve 20 to the inner end of the bolts. With the bolts 17 thus rigidly held in place the wheel disks 15 and 16 and tire rims 18 and 19, respectively, may be removed and applied at will without affecting the brake mechanism.

An annular, ring like, rotatable friction braking element 27, disposed within the flange portion of the wheel disk 16, is provided centrally with an annular securing flange 28 having a sliding fit on the intermediate portion 22 of sleeve 20 and rigidly secured thereto by a plurality of bolts 29 so as to rotate with the hub 12 of the wheel. Disposed within the tire rim 19 and rotatable with the hub 12 is an annular ring like friction braking element 30. The braking element 30 is disposed opposite to and in concentric relation with the braking element 27 and is provided centrally with an annular securing flange 31 having a sliding fit on the inner end portion of the sleeve 20 and rigidly secured to said sleeve by a plurality of spaced bolts 32.

The rotatable braking element 27 is provided on its inner face adjacent its periphery with a raised annular braking portion 33, while on the adjacent face of the rotatable braking element 30 there is provided a like and oppositely disposed raised annular braking portion 34. A plurality of spaced radially arranged grooves 35 are provided in the face of each of the braking portions 33 and 34 of elements 27 and 30, and between said braking portions and the securing flanges 28 and 31 each of said braking elements is provided with a plurality of spaced openings 36 extending from one side to the other of the elements, for reasons which will be later described.

An annular brake cylinder device 37 encircling the sleeve 20 is disposed between and in concentric relation with the rotatable braking elements 27 and 30. The brake cylinder device 37 comprises a central cylindrical bearing portion 38 and an annular cylinder block portion 39 carried by said bearing portion through the medium of a suitable web 40. The bearing portion 38 of the brake cylinder device is lined with a sleeve like bearing member 41 which is journaled on a similar bearing member 42 secured on the portion 21 of the sleeve 20. The bearing members 41 and 42 are both confined between an annular shoulder 43 on sleeve 20 and the adjacent end of the securing flange 31 of the rotatable brake element 30 for the purpose of maintaining the brake cylinder device 37 in the proper working relation to the rotatable brake elements 27 and 30.

Both of the bearing members 41 and 42 are preferably made of material having self-lubricating, low friction properties so that no other provision for lubricating the bearing between said members is required. It will be noted that the entire weight of the brake cylinder device 37 is carried on the bearing between the members 41 and 42.

The annular cylinder block portion 39 of the brake cylinder device 37 is provided with a plurality of spaced piston bores arranged with their axes parallel to the axes of the rotatable braking elements 27 and 30, and in each of these piston bores there is provided a pair of oppositely working brake cylinder pistons 44.

Each of the brake cylinder pistons 44 comprises a piston head 45 slidably mounted in the piston bore, and secured to the inside face of each of said heads is a flexible, disk-like packing 46. A stop ring 47 expanded into a suitable semicircular recess in each of the piston bores midway between its ends is provided for engagement with the peripheral portions of the two packing cups 46 in the bore for defining the normal release position of the pistons 44 as shown in the drawings. One end of each of the stop rings 47 is bent outwardly and disposed in a suitable radial recess in the cylinder block for holding the ring against turning out of a desired position, which is clearly shown in Fig. 2 of the drawings.

Between each pair of pistons 44 there is provided a chamber 48 which is open through a passage 49 provided between the two ends of the stop ring 47 to an annular passage 50 extending around the brake cylinder device through the web portion 40 thereof. It will be noted that by securing the stop rings 47 against turning, said rings are prevented from closing the passages 49. It will also be noted that the several brake cylinder piston chambers 48 are all open to the annular passage 50.

A piston stem 51 carried by the piston head 45 of each of the brake cylinder pistons 44 projects outwardly from the outer face of said pistons for engagement with two oppositely disposed non-rotatable friction braking elements 52 one of which is disposed between one face of the brake cylinder device 37 and the rotatable braking elements 27, while the other is disposed between the opposite face of said brake cylinder device and the braking element 30.

Both of the non-rotatable elements 52 are of the same construction, each comprising a ring-like backing plate 54 arranged for engagement on one face with the adjacent brake cylinder piston rods 51 and provided on the opposite face with a renewable, annular, ring-like brake shoe 55 arranged opposite to and adapted to frictionally engage the raised portions 33 or 34 on the adjacent rotatable elements 27 or 30. The brake shoes 55 may be metallic, a fibrous composition or any other desired friction material.

Each of the non-rotatable elements 52 is provided centrally with a cylindrical portion 56 turned in the direction of the brake cylinder device 37 and slidably mounted on the outer, cylindrical face of the bearing portion 38 of said device. It will be noted that the cylindrical portions 56 of the two non-rotatable elements 52 are turned toward each other and therefore in opposite directions and one slidably engages the bearing portion 38 of the brake cylinder device at each side of the web portion 40 thereof. The cylindrical portions 56 of the non-rotatable elements 52 thus support said elements on the brake cylinder device 37 and in braking relation with the rotatable elements 27 and 30.

Between every other pair of brake cylinder piston bores in the cylinder block 39, the block is cut away and in the space thus provided there is disposed a tension spring 57. One end of each of the springs 57 is hooked over a finger 59 struck out from the backing plate 54 of one of the non-rotatable elements 52, while the opposite end of each of said springs is hooked over a like finger 59 struck out from the opposite backing plate 54. The two non-rotatable elements 52 are thus connected together by the several springs 57 which are under tension and therefore arranged to urge said elements to their release position, as shown in the drawings. The release position of the non-rotatable elements 52 may be defined in any desired manner, such as by engagement of the cylindrical portions 56 of said elements with the bottom of the recesses in which said portions operate, or by engagement of the piston packing cups 46 with the stop rings 47.

Encircling the rotatable elements 27 and 30, the non-rotatable elements 52 and the brake cylinder device 37 and preferably in concentric relation therewith is the cylindrical portion 60 of a brake housing 61. The housing 61 is provided with an annular flange 62 rigidly secured by bolts 63 to an annular flange 64 formed integral with and extending outwardly in a substantially radial direction from a portion of the stationary housing 10 adjacent the free end of the brake sleeve 20. The cylindrical portion 60 of housing 61 is provided with a plurality of spaced slots 58 extending longitudinally thereof, and projecting into an oppositely disposed horizontally arranged pair of these slots are ears 53 formed integral with and extending outwardly from the backing plates 54 of the non-rotatable elements 52. The ears 53 are provided to engage the cylindrical portion 60 of housing 61 to hold the non-rotatable elements 52 against turning relative to the axle housing 10, but the slots 58 are so arranged as to permit free movement of the non-rotatable elements 52 in a direction toward and away from the rotatable elements 27 and 30.

Figure 2:
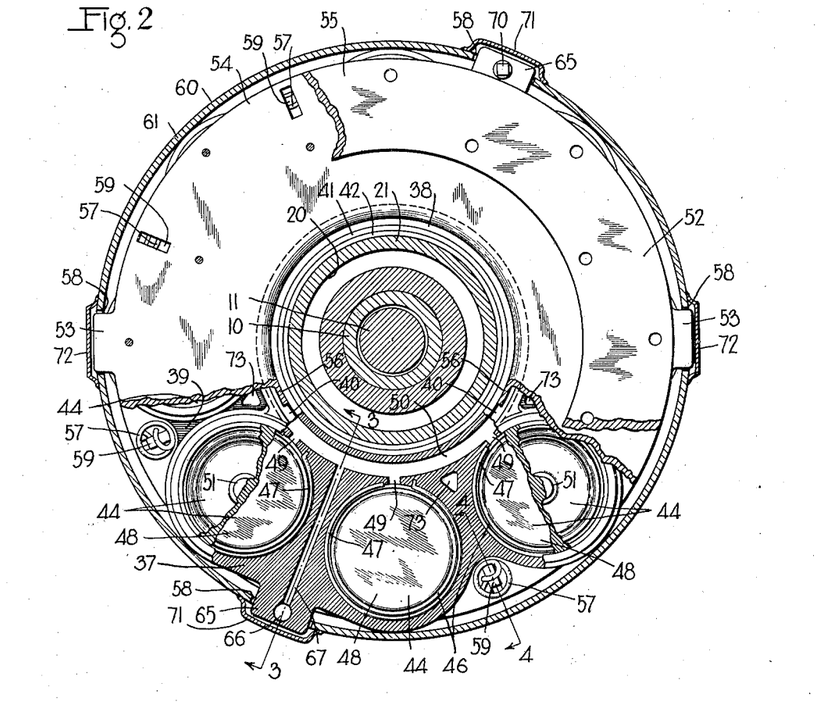
Fig. 2 is a sectional view taken on the line 2—2 in Fig. 1 and showing certain parts broken away to illustrate interior construction of the mechanism.
Figure 3:
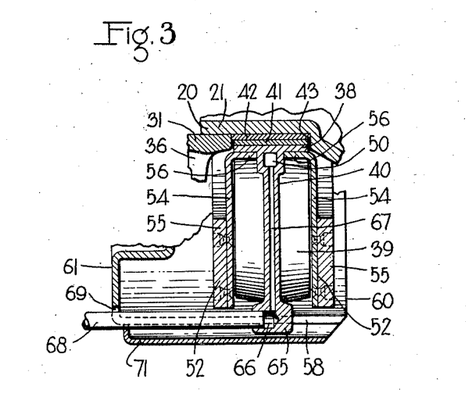
Figs. 3 and 4 are sectional views taken on the lines 3—3 and 4—4, respectively, in Fig. 2.
Figure 4:
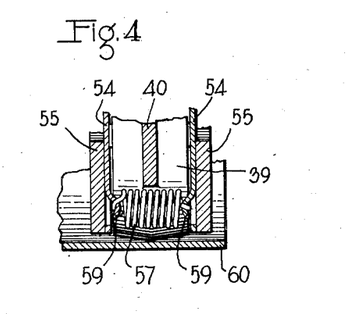

The brake cylinder block 39 is provided with a pair of oppositely disposed ears 65, shown most clearly in Fig. 2, extending outwardly into another pair of oppositely disposed slots 58 provided in housing 61 for holding said block against rotation. Within each of the brake cylinder ears 65 there is provided a passage 66 open at one end through one side of the ear and connected at the other end to a passage 67 which extends inwardly through the cylinder block to the annular passage 50. The open end of one of the passages 66, whichever is more convenient for connecting to at the time the mechanism is installed on a vehicle, is connected to one end of a brake control pipe 68, which extends through the slot 58 and an opening 69 in the inner end wall of the brake housing 61 to the outside of said housing, inside of the vehicle wheel. The passage 66, which is not thus connected to the brake control pipe 68, is closed by a plug 70 as shown in Fig. 2 of the drawings. Each of the slots 58 into which the brake cylinder ears 65 extend is bridged by a cover plate 71, while the other slots 58 are bridged by a cover plate 72. The cover plates 71 and 72 are rigidly secured at their opposite sides to the cylindrical portion 60 of the brake housing so as to render said portion of the housing substantially as rigid as if the slots 58 were not provided therein. This is very desirable, since the housing 61 is adapted to hold the non-rotatable elements 52 against turning during braking engagement with the rotatable elements 27 and 30, as will be hereinafter described.

Between each pair of brake cylinder bores at either side of the radial fluid conducting passages 67, the cylinder block 39 is provided with an opening 73 connecting one side of the block to the other for the purpose of ventilation, as will hereinafter be described.

The rotatable element 30 is provided adjacent its periphery with an annular outstanding flange 76 contained within the housing 61. The outer surface of the flange 76 is cylindrical in form and constitutes a brake drum preferably formed integral with the rotatable element 30. A brake band 77 surrounds the major portion of the periphery of the brake drum 76, said band being provided on the face adjacent said drum with a flexible brake shoe 78 made of any suitable braking material.

Figures 5, 6:
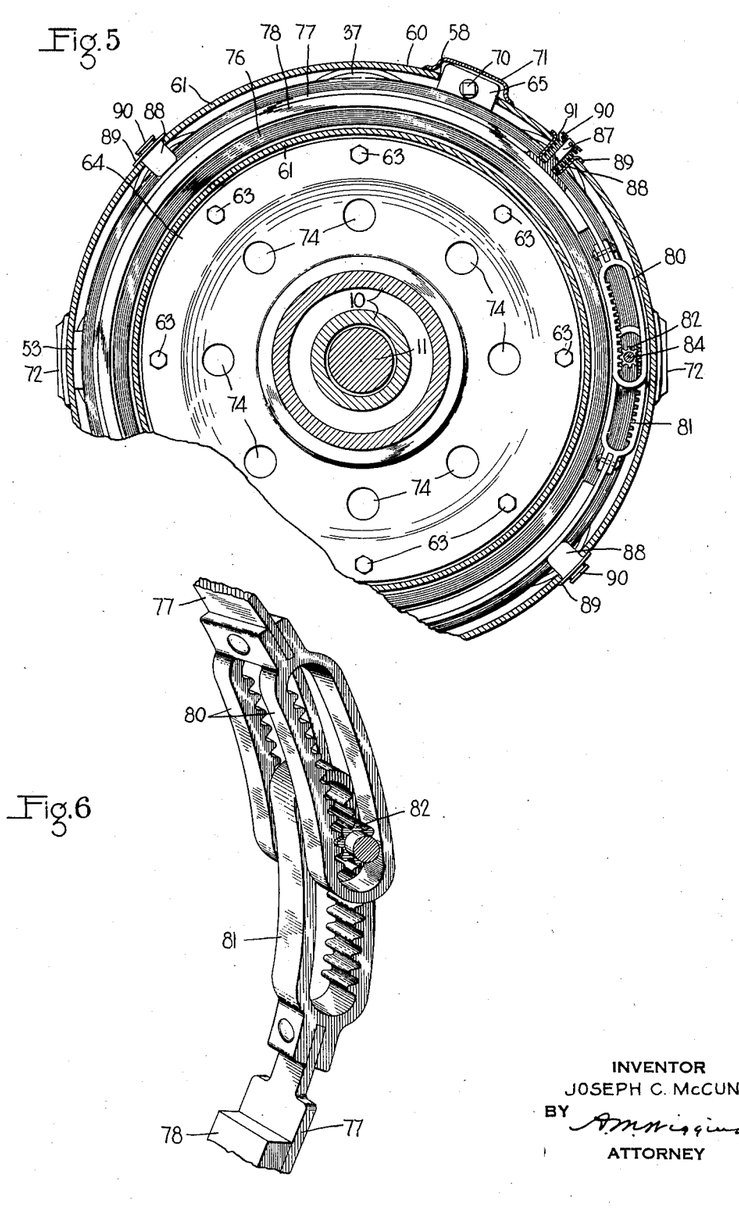
Fig. 5 is a sectional view taken on the line 5—5 in Fig. 1.
Fig. 6 is an isometric view of a portion of certain parts of the mechanism shown in Fig. 5.

One end of the band 77 is connected to a pair of spaced, connected yokes 80 while the other end of the band is connected to an oppositely disposed yoke 81 mounted to slide between the yokes 80. The yokes 80 and 81 encircle a pinion 82 which is journaled at its inner end in a lug 83 fixed to the brake housing 61. Projecting from the opposite end of the pinion 82 is a shaft 84 which extends to the exterior of the brake housing 61 and which is supported to rotate in a boss 85 secured to the outside of said housing. A lever 86 is provided on the outer end of the shaft 84 for turning the pinion 82. The lever 86 may be controlled in any desired manner, for instance, it may be connected up for control from the usual emergency brake lever provided on busses or trucks. The yokes 80 and 81 each have teeth meshing with the pinion 82, the teeth on the yokes 80 meshing with those on the pinion at the opposite side of the pinion from those on the yoke 81, whereby rotation of the pinion 82 is adapted to move the yokes 80 and 81 in opposite directions.

The brake band 76 is provided with suitably spaced pins 87 projecting from its outer face through suitable openings in the brake housing 61. A cup 88 is removably mounted in each of these openings from the outside of the brake housing. Each of the cups has at its inner end a perforation through which the respective pin 87 extends and is adapted to move, while at the outer end each of the cups has an annular flange 89 engaging the housing 61 for supporting the cup. Interposed between the inner end of each of the cups 88 and a disk 90 secured to the end of the respective pin 87 is a spring 91 which is under compression. Each of the springs 91 is adapted to act to draw the adjacent portion of the brake band 77 and lining 78 in the direction toward the cylindrical portion 60 of the brake housing 61 and thus in a direction away from the brake drum 76, and hold said parts in this position while the brakes are released, in the usual well known manner. In order that the release springs 91 may act as just described it is of course essential that the yokes 80 and 81 be in the position shown in Fig. 5 of the drawings as will be later brought out clearly.

The improved brake mechanism above described is adapted to be applied to a vehicle wheel before the hub 12 is mounted on the axle housing 10 and before the wheel disks 15 and 16 and tire rims 18 and 19 are secured to said hub. One method of assembling the mechanism and applying it to a vehicle is as follows.

With the brake housing 61 removed from the axle housing 10, the brake band 77 of the auxiliary braking mechanism is inserted in said housing to its working position and then the cups 88, release springs 91 and retaining disks 90 are assembled and operatively connected to said band. The yokes 80 and 81 are then separated to their release position and the pinion 82 and shaft 84 are then inserted from the interior of the housing through the lug 83 and through said yokes to its working position in which the end of the shaft 84 extends beyond the exterior of the housing. The lever 86 is then applied to the end of the shaft 84. After the auxiliary brake mechanism is thus applied to the brake housing 61, said housing is mounted over the axle housing 10 and rigidly secured to the flange 64 extending from said housing by the bolts 63.

The rotatable element 27 is next mounted on the sleeve 20 in its working position and rigidly secured thereto by the bolts 29. The brake cylinder device 37 having the several brake cylinder pistons 44 already mounted therein and having the non-rotatable elements 53 applied to the opposite sides of said device is then slipped on to the sleeve 20 to its working position. Next the rotatable element 30 is slipped over the end of the sleeve 20 and rigidly secured in its working position by the bolts 32.

This assembly embodying the brake cylinder device 37, non-rotatable elements 52 and rotatable elements 27 and 30, all mounted on sleeve 20, is then rigidly secured as a unit to the wheel hub 12 by the bolts 17, after which the hub 12 and the brake mechanism carried thereby are mounted in the usual manner on the axle housing 10 in the position shown in Fig. 1 of the drawings. In thus assembling the hub 12 and the parts of the brake mechanism carried thereby to the axle housing 10 it will be noted that the ears 53 on the non-rotatable elements 52 and the ears 65 on the brake cylinder device 37 must be lined up with the slots 58 in the brake housing 61 in order to enter said slots as the brake mechanism is inserted into said brake housing to its working position.

After the brake mechanism is thus mounted on the axle housing 10, the fluid conducting pipe 68 is connected to passage 66 in one or the other of the brake cylinder ears 65, whichever is more convenient in the installation. The passage 66 in the other brake cylinder ear 65 is then closed by the plug 70, as above described. The wheel disks 16 and 15, carrying the tire rims 18 and 19 upon which the tires (not shown), may already be mounted, are then secured to the hub flange 14 by the bolts 17 in the usual manner.

Operation

Fluid under pressure is supplied to the pipe 68 in order to effect braking of the vehicle wheel and is released from said pipe in order to release the brakes on said wheel, and the supply of fluid under pressure to and the release of fluid under pressure from said pipe 68 may be controlled in any desired manner, such as by suitable valve means in the form of a brake valve device or the like located in the cab of the bus or truck for operation manually by the operator.

When fluid under pressure is released from the brake cylinder pipe 68, the several chambers 48 between the pairs of brake cylinder pistons 44 are all vented through the passages 49 leading to the annular passage 50 and from thence through the radial passage 67 and passage 66 to the pipe 68. With the several piston chambers 48 thus vented the release springs 57 act to draw the non-rotatable elements 52 to their release position in which they are disengaged from rotatable elements 27 and 30, as clearly shown in Fig. 1 of the drawings. With the non-rotatable elements 52 thus disengaged from the rotatable elements 27 and 30, said rotatable elements are free to rotate with the sleeve 20 and vehicle wheel. The non-rotatable elements 52 and brake cylinder device 37 are held against rotation however due to the ears 65 extending into the slots 58 in the brake housing 61.

When it is desired to brake the vehicle in order to retard or stop rotation of the vehicle wheel, fluid under pressure is supplied to the pipe 68 and from thence flows through the passage 66 and the radial passage 67 in the brake cylinder device 37 to the annular passage 50. From the passage 50 fluid under pressure flows through the several branch passages 49 into the several brake cylinder piston chambers 48 and therein acts on the brake cylinder pistons 44 to move said pistons from their release position, shown in the drawings, outwardly of the piston bores. It will be noted that the pistons 44 in each set are moved away from each other and this movement acts through the piston stems 51 to move the oppositely disposed non-rotatable elements 52 toward and into frictional braking engagement with the adjacent rotatable elements 27 and 30.

After the non-rotatable elements 52 are thus brought into engagement with the rotatable elements 27 and 30, an increase in fluid pressure in the piston chambers 48 forces the non-rotatable elements against the rotatable elements with pressure in order to retard or stop rotation of the rotatable elements and thereby of the sleeve 20 and the vehicle wheel to which said sleeve is rigidly connected. The degree with which the vehicle wheel is thus retarded depends upon the degree of fluid pressure supplied to the piston chambers 48 and may be varied as desired in order to effect the desired rate of retardation of the vehicle.

The radial slots 35 in the braking faces of the rotatable elements 27 and 30 act upon rotation of said elements as a fan to create a flow of air over and between the braking faces of both the rotatable and non-rotatable braking elements, in order to dissipate heat therefrom incident to the frictional braking engagement between said elements. This flow of air is in a direction from the space surrounded by the elements to the space around the outer peripheral faces of said elements and from thence around the end of the cylindrical portion 60 of the brake housing 61 to the space between said housing and the tire rim 19 opening to the atmosphere. Air is supplied from the atmosphere to the space surrounded by the braking elements for flow through the slots 35, by way of openings 74 in the flange extending from the axle housing 10 and from thence through the openings 36 to the rotatable elements 30 and through the openings 73 in the brake cylinder block 39.

The flow of air through the slots 35 in the rotatable elements 27 and 30, in addition to dissipating heat therefrom incident to braking, is also adapted to carry away particles of metal or the like torn from the braking elements during braking contact, in order to maintain the braking faces of the elements clean or free of said particles, whereby a most intimate contact is maintained between said faces during braking in order to provide most efficient braking.

In order to effect a release of the brake after an application, the fluid under pressure is vented from the pipe 68 and thereby from the several piston chambers 48, whereupon the release springs 57 pull the non-rotatable elements 52 out of frictional engagement with the rotatable elements 27 and 30 and return said non-rotatable elements to their release position as shown in the drawings. When the non-rotatable elements 52 are thus pulled out of contact with the rotatable elements 27 and 30, said rotatable elements and thereby the vehicle wheels are free to rotate, as will be evident.

When it is desired to operate the auxiliary brake mechanism in order to hold the vehicle parked, or in case of emergency, the lever 86 is operated to turn the pinion 82 in such direction as to draw the yokes 80 and 81 toward each other. This movement of yokes 80 and 81 contracts the brake band 77 against the opposing pressure of the release springs 91 and thereby brings the brake lining 78 into frictional contact with the exterior, cylindrical surface of the brake drum 76. The drum 76 is thereby secured against rotation in case the vehicle is already stopped, or in case the vehicle is moving said drum is braked in order to effect braking of the vehicle, it being noted that braking of the drum 76 is transferred through the rotatable element 30 and sleeve 20 directly to the vehicle wheel. When it is desired to release the auxiliary brake mechanism, the lever 86 is operated to turn the pinion 82 in the direction for moving the yokes 80 and 81 apart, whereupon the several release springs 91 act to draw the brake band 77 away from the brake drum 76 to its release position, as shown in the drawings.

Figure 7:
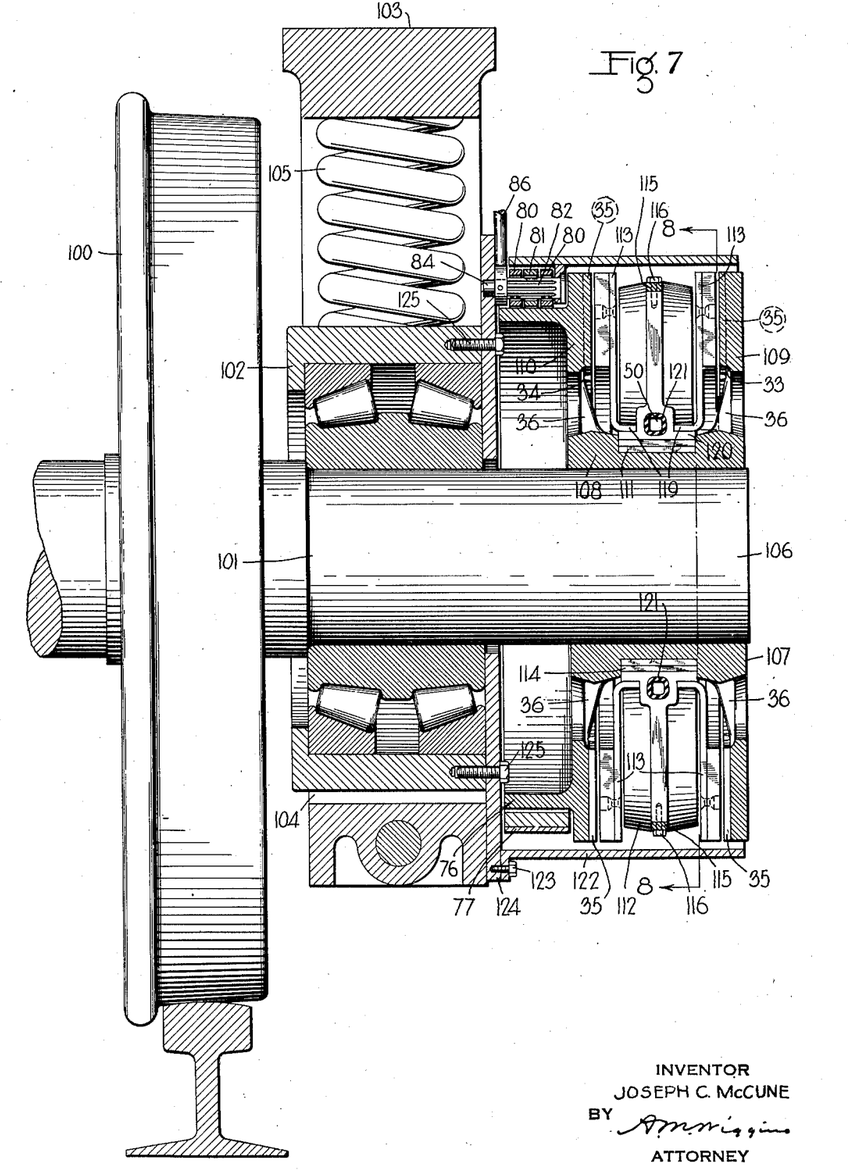
Fig. 7 is a vertical sectional view, similar to Fig. 1, but showing the improved brake mechanism applied to a railway vehicle truck.
Figure 8:
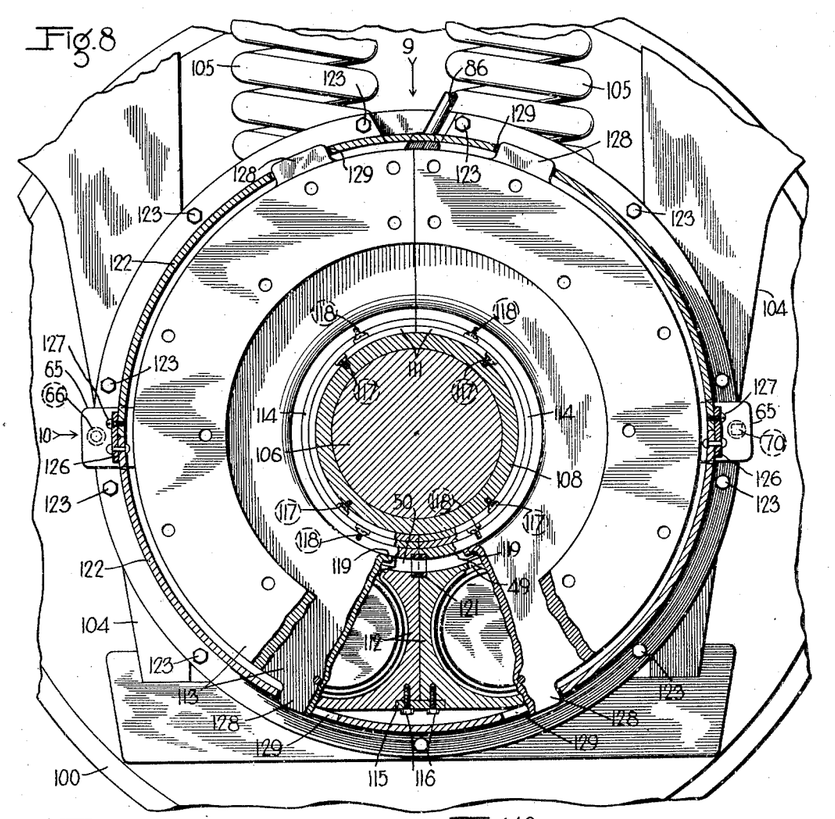
Fig. 8 is a sectional view taken on the line 8—8 in Fig. 7.
Figure 9:
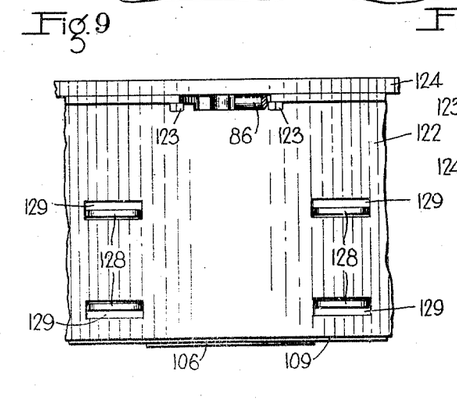
Figs. 9 and 10 are fragmentary plan and side elevation views of the improved mechanism taken in the direction of arrows 9 and 10 in Fig. 8.
Figure 10:
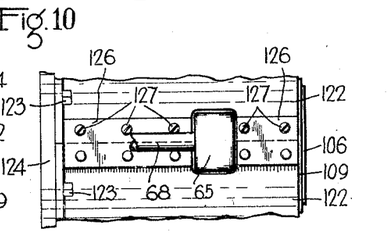

*Modified construction shown in Figs. 7 and 8*

In the brake mechanism above described, the rotatable elements 27 and 30 are shown removably secured to the sleeve 20 which is rigidly secured to the hub 12 for rotation with the vehicle wheel. The brake cylinder device 37 and the non-rotatable elements 52 are in the form of annuli adapted to be mounted on the sleeve 20 before the rotatable element 30 is secured in place, while the brake housing 61 is in one piece since the brake mechanism carried by the sleeve 20 is adapted to be inserted through the open end of said housing to its working position therein.

The rotatable elements and the sleeve carrying same may if desired be made in one integral part, or may be built up if desired, that is, the rotatable elements may be removably secured to the sleeve in a manner similar to the construction above described, but in either case, the brake cylinder device, non-rotatable elements and brake housing may be made in halves or two parts to facilitate the assembly and disassembly between the rotatable elements, without removing either one or the other of the rotatable elements from the sleeve. Such a construction is shown in Figs. 7 to 10 of the drawings in which the brake mechanism is shown applied to the wheel of a railway vehicle, for the purpose of illustration.

From the above description of the form of brake mechanism shown applied to the wheel of a bus or the like and the description to follow of the modified form of brake mechanism shown applied to the wheel of a railway vehicle, it will be noted that both forms are equally well adapted for use with and may be applied to the wheel or wheels of either of these types of vehicles.

In the construction shown in Figs. 7 to 10 of the drawings, the reference character 100 indicates a wheel of the usual type employed on railway vehicles. This wheel is secured in any desired manner to an axle 101 which is journaled in a journal box 102. The reference character 103 indicates one side member of a truck frame, which side member is provided with the usual depending, spaced pedestals 104 which are slidably mounted in suitable slots (not shown) in the opposite sides of the journal box 102. A spring 105 is carried by the journal box 102 and supports the side frame 103. Only a portion of the vehicle truck is shown in the drawing, but this showing is deemed adequate for a clear understanding of the invention since the only parts of the truck pertinent to the invention are the wheel 100, axle 101 and the journal box 102 or any other suitable stationary part of the truck, that is, a part which is not movable relative to the axle 101 in a direction radially thereof.

According to the invention the axle 101 is provided with an extended portion 106 projecting beyond the outer face of the journal box 102 and on this extended portion of the axle there is rigidly secured in any suitable manner, preferably by shrinking, a rotatable element 107 which comprises a sleeve portion 108 having at its opposite ends outwardly extending annular flanges 109 and 110 constituting rotatable friction braking elements. These flanges or rotatable brake elements 109 and 110 are preferably formed integral with the sleeve 108 and are provided on their adjacent faces with raised braking portions 33 and 34, respectively, through each of which there are provided a plurality of radial grooves 35, the same as in the construction shown in Fig. 1 of the drawings.

Encircling the sleeve 108 is a bearing member 111 preferably made in halves secured to said sleeve in any desired manner as by screws 117. An annular brake cylinder device 112 carrying non-rotatable friction braking elements 113 is provided with a bearing member 114 journaled on the bearing member 111 for supporting said device and non-rotatable elements and for rendering the sleeve 108 and the rotatable braking flanges or elements 109 and 110 rotatable relative to said brake cylinder device and non-rotatable elements.

The brake cylinder device 112 differs from the brake cylinder device 37 shown in Fig. 1 of the drawings, only in that it is made in oppositely disposed halves butting and rigidly secured together both above and below the axle extension 106 in any desired manner, as by means of plates 115 set into suitably aligned recesses in the butting halves of the device and secured to each of the halves by screws 116. The bearing member 114 secured in the brake cylinder device is also made in halves secured to the halves of the brake cylinder device in any desired manner as by screws 118.

The non-rotatable elements 113 are preferably the same as the non-rotatable elements 52 shown in Fig. 1 except for being made in halves preferably aligned with the halves of the brake cylinder device 112. The ends of the two halves of each of the non-rotatable elements 113 are arranged in substantial butting relation and each of the halves is provided at its inner periphery with an inturned flange portion 119 slidably mounted on the bearing portion 120 of the brake cylinder device.

A ring gasket 121 is provided in both joints between the two halves of the brake cylinder device for establishing communication between the two parts of the annular passage 50 and to prevent leakage from said passage.

It will be evident that after the sleeve 108 and the rotatable braking elements 109 and 110 carried by said sleeve are secured on the axle extension 106, the two parts of the brake cylinder device 112 and the halves of the non-rotatable elements 113 carried by said parts may be assembled on said sleeve from the opposite sides thereof. After these parts are mounted on the sleeve 108 between the rotatable braking elements 109 and 110 the two halves of the brake cylinder device are secured together by means of plates 115 and screws 116, whereby the brake cylinder device and non-rotatable elements are secured in braking relation with said rotatable elements.

A housing 122 encircling the assemblage of brake cylinder device and braking elements is rigidly secured by screws 123 to an annular disk-like element 124 encircling the axle extension 106 and rigidly secured to the outside face of the journal box 102 by screws 125. The brake housing 122 is thereby rigidly secured against rotation.

The brake housing 122 is preferably made in two substantially semi-circular oppositely disposed sections which are joined together preferably at the opposite sides of the axle extension 106. The two sections of the brake housing may be joined in any suitable manner, but for the purpose of illustration, plates 126 are secured to each of the opposite ends of one of the sections and lap over the adjacent ends of the other section and are removably secured to said adjacent ends by screws 127.

Each half of both of the non-rotatable elements 113 is provided adjacent its two ends with an outwardly extending ear 128, which is disposed to slide in a suitable opening 129 provided in the brake housing 122. The ears 128 cooperating with the housing 122 are adapted to hold the non-rotatable elements 113 against rotation when in braking engagement with the adjacent rotatable elements and said ears are movable in the openings 129 only in the direction to and away from said rotatable elements.

Each half of the brake cylinder device 112 is provided mid-way between its ends with an ear 65 extending through a suitable opening in casing 122 to the exterior thereof. The two ears 65 are located substantially diametrically opposite each other at opposite sides of the axle extension 106, and each is provided with fluid conducting passages, corresponding to passages 66 and 67 in the construction shown in Figs. 1 to 6 through which fluid under pressure is adapted to be supplied to and released from the brake cylinder device 112 for controlling its operation.

The brake housing 122 is adapted to be assembled over the brake mechanism disposed between the rotatable elements 109 and 110 after said mechanism has been mounted on the sleeve 111 and secured in place, and must be removed before said mechanism can be removed from between said two rotatable elements.

The rotatable braking element 110 is provided on its outer face with a cylindrical extension 76, preferably formed integral therewith, and constituting a brake drum. Surrounding this drum is a brake band 77 adapted to be contracted into frictional engagement therewith in the same manner and by mechanism such as disclosed in Figs. 1, 5 and 6 of the drawings, hereinbefore described. In this embodiment, the lever 86 for contracting the brake band is, however, located within the brake housing 122 and extends through an opening formed in the topmost portion of said housing for connection with the usual wheel or lever (not shown) provided on railway vehicles for applying the brakes on such vehicles by hand.

It should be noted that in both embodiments of the invention above described, the brake cylinder device carries the non-rotatable braking elements and is journaled on and carried by a sleeve between the rotatable braking elements which are rigidly secured to said sleeve for rotating with the wheel to be braked. This provides a construction which is very simple, compact and efficient for braking purposes. It should further be noted that the construction disclosed in both of the embodiments of the invention can be readily associated with or dissociated from the wheel or axle to be braked, and either form is equally well adapted for use in connection with any of the various types of wheels and axles employed on different types of vehicles.

While two illustrative embodiments of the invention have been described in detail, it is not the intention to limit the scope to these embodiments or otherwise than by the terms of the appended claims.

Having now described my invention, what I claim as new and desire to secure by Letters Patent, is:

1. In a vehicle brake, in combination, a rotatable member to be braked, a sleeve disposed in concentric relation with and secured to said member for rotation therewith, an annular, rotatable, friction braking element secured to said sleeve to rotate with said member, an annular non-rotatable friction braking element adapted to be moved into frictional engagement with said rotatable element for braking said member, and a brake cylinder device journaled directly on and carried by said sleeve and operatively connected to said non-rotatable element for controlling the movement thereof.

2. A brake for a vehicle wheel comprising in combination, a sleeve secured to rotate with said wheel in concentric relation therewith, an annular rotatable friction braking element secured rigidly to said sleeve, an annular non-rotatable friction braking element adapted to be moved into frictional braking engagement with said rotatable element for braking said wheel, and an annular brake cylinder device encircling and carried by said sleeve, said brake cylinder device being journaled internally on said sleeve adjacent said rotatable element and operatively connected to said non-rotatable element for controlling movement thereof.

3. A brake for a vehicle wheel comprising in combination, a sleeve secured to rotate with said wheel in concentric relation therewith, an annular rotatable friction braking element secured rigidly to said sleeve, an annular brake cylinder device comprising a casing encircling said sleeve and journaled on and carried by said sleeve adjacent said rotatable element, and a non-rotatable friction braking element carried by said casing in cooperative relation with said rotatable element, and movable by said brake cylinder device into frictional braking engagement with said rotatable element for braking said wheel.

4. A brake for a vehicle wheel comprising a sleeve rigidly secured at one end to said wheel in concentric relation therewith, a pair of oppositely disposed annular rotatable friction braking elements rigidly secured to said sleeve in spaced relation, said sleeve having an annular bearing surface between said elements, an annular brake cylinder device encircling said sleeve between said elements and journaled and supported on said surface, and a non-rotatable friction braking element disposed for frictional braking engagement with each of said rotatable elements and operatively connected to said brake cylinder device for control thereby.

5. A brake for a vehicle wheel comprising a sleeve rigidly secured at one end to said wheel in concentric relation therewith, a pair of oppositely disposed annular, rotatable friction braking elements formed integral with and encircling said sleeve and being spaced on said sleeve, said sleeve having between said elements an annular bearing surface, an annular brake cylinder device disposed between said elements and encircling said sleeve and journaled and supported on said surface, said brake cylinder device being formed in two substantially semi-circular sections for application to and removal from said surface, means for rigidly securing said two sections together, and a non-rotatable friction braking element disposed for frictional braking engagement with each of said rotatable elements and operatively connected to said brake cylinder device for control thereby.

6. In a vehicle brake, in combination, a rotatable member to be braked, an annular rotatable friction braking element secured to said member for rotation therewith, an annular non-rotatable friction braking element adapted to be moved into frictional engagement with said rotatable element for braking said member, an annular brake cylinder device encircling said member and journaled on and carried by said member and operatively connected to said non-rotatable element for controlling movement thereof, said brake cylinder device having at one side an annular recess, and said non-rotatable element having a portion slidable in said recess for supporting said non-rotatable element in braking relation with said rotatable element.

7. A brake for a vehicle wheel comprising in combination, a sleeve secured to rotate with said wheel, a pair of oppositely disposed annular rotatable friction braking elements rigidly secured to said sleeve in spaced relation, an annular brake cylinder device encircling and supported by said sleeve between said elements and having an internal bearing on said sleeve, a non-rotatable friction braking element disposed between each of the opposite sides of said brake cylinder device and the adjacent rotatable element adapted to be moved into frictional engagement with said rotatable elements for effecting braking of said wheel, and means operatively connecting said brake cylinder device to said non-rotatable elements for controlling movement thereof, said non-rotatable elements and brake cylinder device being formed in separable, substantially semi-circular sections, and removable means rigidly securing the sections of said brake cylinder device together in the form of an annulus.

8. A brake for a vehicle wheel comprising in combination, a sleeve secured to rotate with said wheel, a pair of oppositely disposed annular rotatable friction braking elements rigidly secured to said sleeve in spaced relation, an annular brake cylinder device disposed between said elements and having an internal supporting bearing on said sleeve, a non-rotatable element disposed between each of the opposite sides of said brake cylinder device and the adjacent rotatable element, and means operatively connecting said brake cylinder device and said non-rotatable elements for controlling movement of said non-rotatable elements into frictional braking engagement with said rotatable elements.

9. A brake for a vehicle wheel comprising in combination, a sleeve removably secured at one end to said wheel for rotation therewith, a pair of oppositely disposed annular rotatable friction braking elements rigidly secured to said sleeve in spaced relation, the rotatable element most remote from the end of said sleeve secured to said wheel, being removable from said sleeve, an annular brake cylinder device journaled and supported axially on said sleeve between said elements, a non-rotatable friction braking element disposed between each of the opposite sides of said brake cylinder device and the adjacent rotatable element, and means operatively connecting said brake cylinder device to said non-rotatable elements for controlling movement thereof into frictional braking engagement with said rotatable elements, each of said non-rotatable elements and said brake cylinder device being formed in one ring-like part adapted to be applied to and removed from said sleeve only with the rotatable element most remote from the secured end of said sleeve removed from said sleeve.

10. A brake for a vehicle wheel comprising in combination, a sleeve secured to said wheel for rotation therewith, a pair of annular disks formed integral with said sleeve and spaced one from the other and constituting a pair of rotatable friction braking elements, an annular brake cylinder device disposed between said disks and journaled and supported axially on said sleeve, a non-rotatable element disposed between each of the opposite sides of said brake cylinder device and the adjacent disks and adapted to be moved into engagement with the adjacent disks for effecting braking of said wheel, said brake cylinder device and non-rotatable elements being formed in oppositely disposed, substantially semi-circular sections, means associated with said brake cylinder device for carrying the adjacent sections of said non-rotatable elements, and removable means for connecting the two sections of said brake cylinder device together into a rigid ring-like structure.

11. A brake mechanism for a vehicle having a stationary axle housing, an axle rotatable in said housing, and a wheel secured to said axle for rotation therewith, said mechanism comprising a sleeve encircling said housing and secured rigidly at one end to said wheel for rotation therewith, a pair of annular rotatable braking disks rigidly secured to said sleeve in spaced relation and rotatable with said sleeve, an annular brake cylinder device disposed between said disks encircling said sleeve and journaled on said sleeve, a non-rotatable element disposed between each of the opposite faces of said brake cylinder device and the adjacent rotatable disks and adapted to be moved into frictional engagement with said disks for braking said wheel, and means operatively connecting said brake cylinder device to said non-rotatable elements for controlling movement thereof.

12. A brake mechanism for a vehicle having a part fixed against rotation and having an axle and a wheel secured to said axle for rotation therewith, said brake mechanism comprising a sleeve secured to rotate with said axle in concentric relation therewith, a pair of annular rotatable friction braking elements rigidly secured to said sleeve in spaced relation, an annular brake cylinder device disposed between said rotatable elements and encircling and journaled on said sleeve, a non-rotatable friction braking element disposed between each of the opposite faces of said brake cylinder device and the adjacent rotatable element and adapted to be moved by said brake cylinder device into frictional engagement with said rotatable elements for effecting braking of said wheel, said non-rotatable elements being supported on said brake cylinder device, a brake housing rigidly secured to said fixed part of the vehicle, and means associated with the non-rotatable elements and cooperative with said brake housing for holding said non-rotatable elements against rotation but for permitting movement of said non-rotatable elements in the direction of said rotatable elements.

13. A brake mechanism for a vehicle having a part fixed against rotation and having an axle and a wheel secured to said axle for rotation therewith, said brake mechanism comprising a sleeve secured to rotate with said axle in concentric relation therewith, a pair of annular rotatable friction braking elements rigidly secured to said sleeve in spaced relation, an annular brake cylinder device disposed between said rotatable elements and encircling and journaled on said sleeve, a non-rotatable friction braking element disposed between each of the opposite faces of said brake cylinder device and the adjacent rotatable element and adapted to be moved by said brake cylinder device into frictional engagement with said rotatable elements for effecting braking of said wheel, said non-rotatable elements being supported on said brake cylinder device, a brake housing rigidly secured to said fixed part of the vehicle and comprising a cylindrical portion encircling said non-rotatable elements and having a plurality of slots extending in the direction of its length, said non-rotatable elements having ears projecting into said slots and adapted to slide therein, said ears being cooperative with said housing to hold said non-rotatable elements against rotation.

14. A brake mechanism for a vehicle having a part fixed against rotation and having an axle and a wheel secured to said axle for rotation therewith, said brake mechanism comprising a sleeve secured to rotate with said axle in concentric relation therewith, a pair of annular rotatable friction braking elements rigidly secured to said sleeve in spaced relation, an annular brake cylinder device disposed between said rotatable elements and encircling and journaled on said sleeve, a non-rotatable friction braking element disposed between each of the opposite faces of said brake cylinder device and the adjacent rotatable element and adapted to be moved by said brake cylinder device into frictional engagement with said rotatable elements for effecting braking of said wheel, said non-rotatable elements being supported on said brake cylinder device, a brake housing rigidly secured to said fixed part of the vehicle and comprising a cylindrical portion encircling said non-rotatable elements and having a plurality of slots extending in the direction of its length, said non-rotatable elements having ears projecting into said slots and adapted to slide therein, said ears being cooperative with said housing to hold said non-rotatable elements against rotation and said brake cylinder device having a lug projecting through an opening in said housing to the exterior thereof, and a fluid pressure pipe connected to said lug outside of said brake housing through which fluid under pressure is adapted to be supplied to and released from said brake cylinder device for controlling its operation.

15. A brake mechanism for a vehicle having a stationary axle housing, an axle disposed to turn in said housing and a wheel secured to said axle for rotation therewith, said mechanism comprising a sleeve encircling but spaced from said housing and secured rigidly at one end of said wheel for rotation therewith, a pair of rotatable friction braking elements rigidly secured to said sleeve in spaced relation, a brake cylinder device disposed between said rotatable elements and encircling said sleeve and journaled on said sleeve, a non-rotatable friction braking element disposed between each of the opposite faces of the brake cylinder device and the adjacent rotatable element and adapted to be moved into engagement with the adjacent rotatable element for effecting braking of said wheel, means operatively connecting said brake cylinder device to said non-rotatable elements for controlling movement thereof, a brake housing secured to said axle housing and having a portion surrounding said non-rotatable elements and brake cylinder device, and means associated with said non-rotatable elements and brake cylinder device and cooperative with said brake housing for securing said non-rotatable elements and brake cylinder device against rotation.

16. A brake mechanism for a wheel of a vehicle, said vehicle having a part fixed against rotation, said brake mechanism comprising a sleeve secured to rotate with said wheel, a pair of rotatable friction braking elements rigidly secured to said sleeve in spaced relation, an annular brake cylinder device encircling and journaled on said sleeve between said rotatable elements, a non-rotatable friction braking element interposed between each of the opposite faces of said brake cylinder device and the adjacent rotatable element and adapted to be moved into frictional engagement with the rotatable element for effecting braking of said wheel, means operatively connecting said brake cylinder device to said non-rotatable elements for controlling movement thereof, said brake cylinder device and non-rotatable elements comprising two oppositely disposed substantially semi-circular sections, means for rigidly securing the two sections of said brake cylinder device together, and a brake housing rigidly but removably secured to said fixed part of the vehicle and comprising a cylindrical portion encircling said non-rotatable elements and brake cylinder device, means associated with said non-rotatable elements cooperative with said brake housing to hold said non-rotatable elements against rotation, said housing being formed in two oppositely disposed substantially semi-circular sections whereby upon removal of said housing from the fixed part of the vehicle the sections of said brake cylinder device and non-rotatable elements may be applied to or removed from the space between said rotatable elements, and means for rigidly securing the two sections of said brake housing together when said housing is secured to the fixed part of the vehicle.

17. A brake mechanism for a vehicle having an axle housing, an axle disposed to rotate in said housing, and a wheel comprising a hub portion secured to said axle for rotation therewith, a wheel disk encircling said hub and rigidly secured thereto and having an outwardly extending portion inclined inwardly over said housing, and a tire rim rigidly secured to the outer peripheral portion of said disk for rotation therewith, said brake mechanism comprising a sleeve encircling said housing within said tire rim and rigidly secured at one end to said wheel for rotation therewith, a pair of oppositely disposed annular rotatable friction braking elements encircling said sleeve and rigidly secured thereto in spaced relation, an annular brake cylinder device encircling said sleeve between said rotatable elements and journaled on said sleeve, a non-rotatable friction braking element disposed between each of the opposite sides of said brake cylinder device and the adjacent rotatable element adapted to be moved into frictional braking engagement with the rotatable element for effecting braking of said wheel, means operatively connecting said brake cylinder device to said non-rotatable elements for controlling movement thereof, and means rigidly secured to said axle housing and having a connection with said non-rotatable elements for holding said non-rotatable elements against rotation.

18. A brake mechanism for a vehicle having an axle housing, an axle disposed to rotate in said housing, and a wheel having a hub portion journaled on said housing and secured to said axle for rotation therewith, said mechanism comprising a sleeve encircling said housing and rigidly secured at one end to said hub for rotation therewith, a pair of oppositely disposed annular rotatable friction braking elements encircling said sleeve and rigidly secured thereto in spaced relation, an annular brake cylinder device encircling said sleeve between said rotatable elements and journaled on said sleeve, an annular non-rotatable friction braking element interposed between each of the opposite faces of said brake cylinder device and the adjacent rotatable element and encircling said sleeve and adapted to be moved into frictional engagement with the adjacent rotatable elements for effecting braking of said wheel, means operatively connecting said brake cylinder device to said non-rotatable elements for controlling movement thereof, and means secured to said axle housing and connected to said non-rotatable elements securing said non-rotatable elements against rotation.

19. A brake mechanism for a vehicle having a rotatable member to be braked, said mechanism comprising an annular rotatable friction braking element rigidly secured to said member for rotation therewith and having on one side a friction face, an annular non-rotatable friction braking element disposed to frictionally engage said friction face, means for actuating said non-rotatable element, a brake drum projecting from the opposite side of said rotatable element and having a cylindrical braking surface, a brake band disposed to frictionally engage said braking surface over the major portion of its circumference, and lever actuated means for controlling movement of said brake band into and out of frictional braking engagement with said surface.

20. A brake for a vehicle wheel comprising in combination an annular rotatable friction braking disk secured to said wheel for rotation therewith and having on one side a radially disposed friction braking face, an annular non-rotatable friction braking disk disposed to frictionally engage said braking face, fluid pressure controlled means operatively connected to said non-rotatable element for controlling the operation thereof, said non-rotatable element having on the face opposite said braking face an outwardly extending brake drum provided with a cylindrical braking surface, a brake band disposed to frictionally engage said surface over the major portion of its length, and mechanical means for actuating said brake band.

21. A brake for a vehicle wheel comprising in combination an annular rotatable friction braking disk secured to said wheel for rotation therewith and having on one side a radially disposed friction braking face, an annular non-rotatable friction braking disk disposed to frictionally engage said braking face, fluid pressure controlled means operatively connected to said non-rotatable element for controlling the operation thereof, said non-rotatable element having on its opposite face an extended portion provided with a cylindrical braking surface, a brake band encircling the major portion of said braking surface, and mechanically controlled means connected to the two ends of said brake band for controlling the contraction thereof into frictional engagement with said surface and the movement thereof out of engagement with said surface.

22. A brake mechanism for a vehicle wheel comprising a sleeve secured to said wheel for rotation therewith, a pair of rotatable annular friction braking elements encircling said sleeve and rigidly secured thereto in spaced relation, said rotatable elements having on their adjacent faces radially arranged friction faces, an annular brake cylinder device encircling said sleeve and journaled thereon between said rotatable elements, an annular non-rotatable element disposed between each of the opposite faces of said brake cylinder device and the braking face of the adjacent rotatable element and adapted to be moved into engagement with the braking face of the adjacent rotatable element for effecting braking of said wheel, means operatively connecting said brake cylinder device to said non-rotatable elements for controlling movement thereof, a brake drum projecting from the outer face of one of said rotatable elements and having a cylindrical braking surface, a friction brake band surrounding the major portion of the circumference of said braking surface, means operatively connected to the two ends of said brake band for drawing said ends together to contact said brake band into frictional braking engagement with said braking surface, and a lever connected to said means for controlling the operation thereof.

23. A brake mechanism for the wheel of a vehicle comprising in combination a sleeve secured to said wheel for rotation therewith, a pair of annular rotatable friction braking elements encircling said sleeve and rigidly secured thereto in spaced relation, a sleeve like bearing made of low friction material encircling and secured to said sleeve between said rotatable elements, an annular brake cylinder device encircling said sleeve between said rotatable element, a sleeve like bearing of low friction material secured axially in said brake cylinder device and journaled on the bearing on said sleeve, means securing said brake cylinder device against rotation, an annular non-rotatable friction braking element disposed between each of the opposite faces of said brake cylinder device and the adjacent rotatable element adapted to be moved into frictional contact with said rotatable elements for effecting braking of said wheel, means operatively connecting the brake cylinder device to said non-rotatable element for controlling the movement thereof and means securing said non-rotatable elements against rotation.

24. A brake mechanism for a wheel of a vehicle comprising a member secured to said wheel for rotation therewith, a pair of annular rotatable friction braking elements secured to said member in spaced relation, an annular brake cylinder device encircling and journaled on said member between said rotatable elements, a non-rotatable friction braking element disposed between each of the opposite faces of said brake cylinder device and the adjacent rotatable element adapted to be moved into frictional engagement with the rotatable element for effecting braking of said wheel, a member secured against rotation encircling said non-rotatable elements and said brake cylinder device and having a connection therewith for holding said non-rotatable elements and said brake cylinder device against rotation, said brake cylinder device comprising a plurality of sets of oppositely disposed pistons operatively connected to said non-rotatable elements and adapted to be operated by fluid under pressure supplied to a chamber formed between each of said sets of pistons for moving said non-rotatable elements into frictional braking engagement with said rotatable elements, said brake cylinder device having formed therein an annular passage to which all of said chambers are opened, said brake cylinder device also having a passage connected at one end to said annular passage and extending to the outer peripheral portion of said device, and a fluid pressure control pipe extending through the member secured against rotation and communicating with the outer end of the last named passage for supplying fluid under pressure to and releasing fluid under pressure from said several chambers for controlling the operation of the brake cylinder pistons.

25. A brake mechanism for a vehicle wheel comprising in combination a rotatable member secured to rotate with said wheel, a pair of annular rotatable friction braking elements encircling said rotatable member and rigidly secured thereto in spaced relation, an annular brake cylinder device disposed between said rotatable elements and encircling said member and having an axial bearing portion journaled on said member and a cylinder block portion surrounding said axial portion and a connecting web supporting said cylinder block portion on said bearing portion, an annular non-rotatable friction braking element disposed between each of the opposite faces of said brake cylinder device and the adjacent rotatable brake element movable in a direction parallel to the axis of said member into frictional engagement with the rotatable element for effecting braking thereof, each of said non-rotatable elements having a cylindrical portion in sliding contact with a cylindrical surface on the bearing portion of said brake cylinder device for supporting the non-rotatable element on said brake cylinder device and for permitting movement thereof relative to said brake cylinder device in the direction of the adjacent rotatable element, and a fixed housing surrounding and having a connection with said non-rotatable elements and brake cylinder device for holding said non-rotatable elements and brake cylinder device against rotation.

26. A brake for a vehicle wheel comprising a circular member secured to rotate with said wheel, a pair of rotatable friction braking elements rigidly secured to said member in spaced relation, an annular brake cylinder device disposed between said rotatable elements and encircling said member, means for supporting said brake cylinder device, a non-rotatable friction braking element disposed between each of the opposite faces of said brake cylinder device and the adjacent rotatable element adapted to be moved into frictional engagement with the rotatable element for effecting braking of said wheel, means operatively connecting said brake cylinder device to the non-rotatable elements for controlling movement thereof, means for supporting said non-rotatable elements in braking relation with said rotatable elements, means for securing said non-rotatable elements against rotation, each of said non-rotatable elements comprising a backing plate supported by said brake cylinder device and movable relative thereto in an axial direction, a brake shoe secured to each of said backing plates for frictional engagement with the adjacent rotatable element, a plurality of hooks on each of said backing plates struck out from portions of the backing plate and equally spaced around its axis, the hooks on one backing plate being disposed opposite those on the other backing plate, and a spring under tension connected to each oppositely disposed pair of hooks, said springs being operative to urge said non-rotatable elements into engagement with said brake cylinder device and thereby out of braking engagement with said rotatable elements.

27. A brake for a vehicle wheel and axle assembly comprising in combination, a brake element rotatable with the vehicle wheel, said brake element comprising a pair of spaced friction disks and a circular portion encircling the axle of the assembly and extending between and connecting said disks together, non-rotatable brake disks movable into frictional braking engagement with the disks of said brake elements, and a non-rotatable brake cylinder device journaled on and supported by said circular portion between said spaced friction disks operable to move said non-rotatable brake disks into braking engagement with the pair of spaced friction disks of said element.

28. A brake for a vehicle wheel comprising in combination, a brake element rotatable with the vehicle wheel, said brake element comprising a pair of spaced friction disks and a circular portion extending between and connecting said disks together, non-rotatable brake disks movable into frictional braking engagement with the disks of said brake elements, a non-rotatable brake cylinder device journaled on said circular portion operable to move said non-rotatable brake disks into engagement with said elements, a brake drum extending outwardly from the exterior surface of one of said pair of spaced friction disks, friction means operable into braking engagement with said drum and means other than said brake cylinder device for actuating said friction means.

29. In a brake mechanism for a wheel and axle assembly of a railway vehicle truck, in combination, a plurality of spaced rotatable braking elements, the space between said elements having air inlet and outlet communications with the atmosphere, the outlet communication being located a greater distance from the axes of the elements than the inlet communication to provide for the flow of air radially across the braking faces of the elements, fluid pressure operated means operating on all of said elements to effect braking action, and manually operative means for operating on less than all of said rotatable braking elements to effect braking action.

30. In a brake mechanism for a wheel and axle assembly of a railway vehicle truck, in combination, a plurality of rotatable braking elements, the space between said elements having air inlet and outlet communications with the atmosphere, the outlet communication being located a greater distance from the axes of the elements than the inlet communication to provide for the flow of air radially across the braking faces of the elements, fluid pressure controlled means operating on all of said elements to effect braking action, and manually operative means operable independently of the operation of the fluid pressure means for acting on less than all of said rotatable elements to effect braking action.

31. In a brake mechanism for a wheel and axle assembly of a railway vehicle truck, in combination, a rotatable brake element, a non-rotatable brake element spaced from said rotatable brake element, the space between said elements having radially spaced air inlet and outlet communications with the atmosphere, the outlet communication being at the peripheral edges of the elements and the inlet communication being located nearer to the axes of the elements to provide for the flow of air radially across the braking faces of the elements, said brake elements being adapted to interengage to brake said assembly, fluid pressure operative means for effecting the interengagement of said elements, and manually operative means operating upon said rotatable brake element for also braking the assembly.

32. In a brake mechanism for a wheel and axle assembly of a railway vehicle truck, in combination, rotatable and non-rotatable brake elements normally spaced from each other and adapted to interengage to brake said assembly, the spaces normally existing between said elements having air inlet and outlet communications with the atmosphere, the outlet communication being located a greater distance from the axes of the elements than the inlet communication to provide for the flow of air radially across the braking faces of the elements, fluid pressure operative means for effecting the interengagement of all of said elements to effect braking action, and manually operative means for operating on less than all of said rotatable elements for also effecting braking action.

33. In a brake mechanism for a wheel and axle assembly of a railway vehicle truck, in combination, rotatable and non-rotatable brake elements normally spaced from each other and adapted to interengage to brake said assembly, the spaces normally existing between said elements having air inlet and outlet communications with the atmosphere, the outlet communication being located a greater distance from the axes of the elements than the inlet communication to provide for the flow of air radially across the braking faces of the elements, fluid pressure operative means for effecting the interengagement of all of said elements to effect braking action, one of said elements having an extension providing an additional braking surface, and manually operative means acting on said extension for also effecting braking action.

34. In a brake mechanism for a wheel and axle assembly of a railway vehicle truck, in combination, rotatable and non-rotatable brake elements normally spaced from each other and adapted to interengage to brake said assembly, the spaces normally existing between said elements having air inlet and outlet communications with the atmosphere, the outlet communication being located a greater distance from the axes of the elements than the inlet communication to provide for the flow of air radially across the braking faces of the elements, fluid pressure operative means for effecting the interengagement of said elements to effect braking action, the rotatable brake element being secured against axial movement relative to the wheel of said assembly and having an extension forming an additional braking surface, and manually operative means for acting upon said additional braking surfaces for also effecting braking action.

35. A brake for a vehicle wheel and axle assembly, in combination, a brake element encircling the axle of said assembly and secured for rotation therewith, said element comprising spaced braking disks and a tubular portion connecting said disks and encircling the axle of said assembly, a non-rotatable member journaled between said disks on said tubular portion, non-rotatable braking disks carried by said member, and fluid pressure responsive means carried by said member operative to effect frictional braking interengagement of said disks.

36. A brake arrangement for a vehicle wheel comprising a sleeve-like element secured to rotate with said wheel and having a brake drum in concentric relation with said wheel, a brake disk secured to said sleeve for rotation with said wheel in concentric relation therewith, a braking member arranged for radial movement into frictional braking engagement with said drum, a braking member arranged for axial movement into frictional braking engagement with said disk, and means for actuating said braking members.

37. A brake arrangement for a wheel of a railway vehicle comprising a horizontally extending drum rotatably associated with said wheel, said drum having a peripheral braking surface and spaced vertically disposed annular braking surfaces, a friction shoe for braking engagement with said peripheral surface and friction disks for braking engagement with said annular braking surfaces, each of said disks being arranged to engage one of the annular braking surfaces.

38. A brake mechanism for a vehicle having a rotatable member to be braked, said mechanism comprising an annular rotatable friction braking element rigidly secured to said member for rotation therewith and having on one side a friction face, an annular non-rotatable friction braking element disposed to frictionally engage said friction face, means for actuating said non-rotatable element, a brake drum projecting from the opposite side of said rotatable element and having a cylindrical braking surface, friction means operable into braking engagement with said drum, and means other than the non-rotatable element actuating means for actuating said friction means.

39. A brake arrangement for a vehicle wheel and axle assembly, comprising a sleeve-like element secured to said assembly for rotation therewith, said element comprising a braking disk having on one side a friction braking face and on the opposite side an annular brake drum, a braking member arranged for radial movement into frictional braking engagement with said drum, a braking member arranged for axial movement into braking engagement with said friction braking face, and non-rotatable means journaled on said sleeve like member for actuating the axially movable braking member.

JOSEPH C. McCUNE.